Patented July 28, 1942

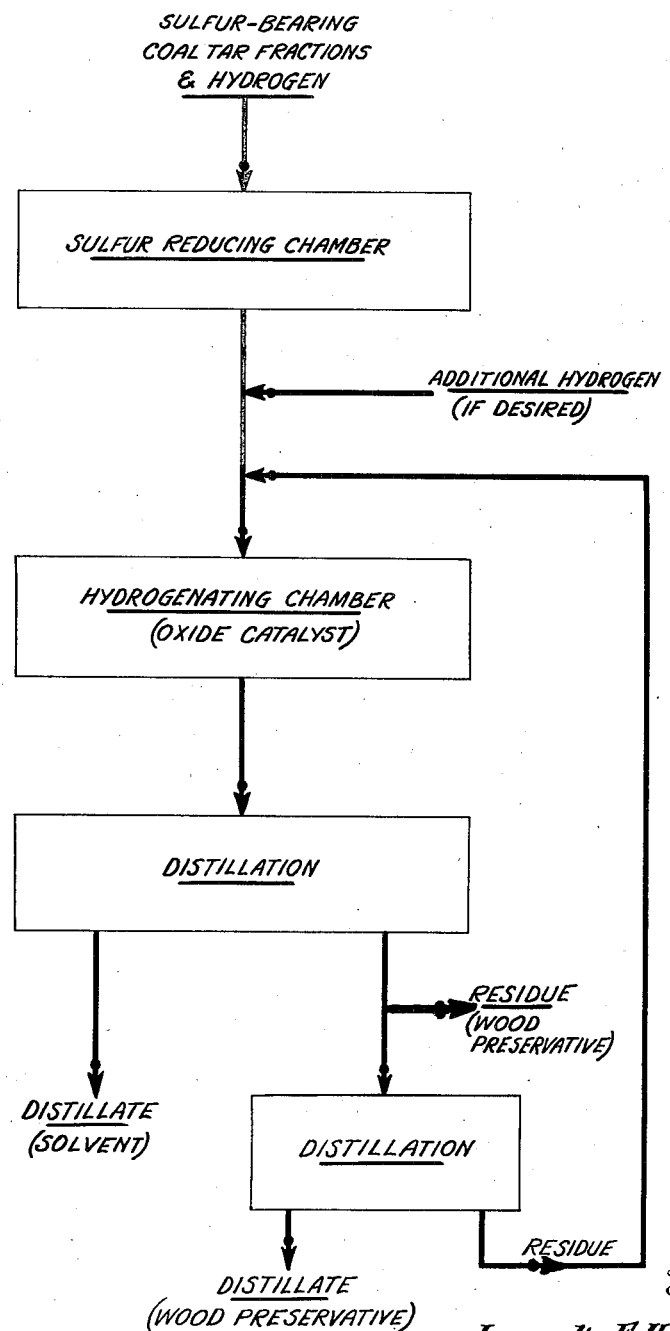

2,291,304

UNITED STATES PATENT OFFICE 2,291,304

PRODUCTION OF SOLVENTS AND WOOD PRESERVATIVES

Jacquelin E. Harvey, Jr., Atlanta, Ga., assignor of one-half to Southern Wood Preserving Company, East Point, Ga., a corporation of Georgia Application August 14, 1940, Serial No. 352,665

4 Claims. (Cl. 196—53)

This invention relates to the production of joint products having useful characteristics.

More specifically, the present invention relates to the joint production of solvents and wood preservatives from hydrocarbons, said hydrocarbons being characterized by sulphur content.

Another object of the present invention is the joint production of refined solvents and wood preservatives from tars of aromatic content and fractions thereof under conditions that induce no substantial percentage of fractions of low solvency or low toxicity, or, stated in another manner, under conditions so controlled as to induce no substantial percentage of liquid chain structures or other liquids of relatively low toxicity or solvency that would preclude the induction of solvency and toxicity.

Another object of the invention is the joint production of refined solvents and wood preservatives of superior solvency and added toxicity under conditions that induce no substantial percentage of carbonaceous deposition.

Other objects of the invention will become apparent from the following disclosures.

The invention will be understood from the following description of illustrative steps comprising various methods of securing the objects of the invention, when read in connection with the accompanying drawing wherein the figure is a diagrammatic sketch of an apparatus for carrying out a form of the process of the invention and wherein the nature of the step carried out in each chamber and the contents thereof are indicated by legend.

*Example 1.*—A coal tar creosote, coke residue of 2%, specific gravity of 1.08, 35% residue above 355° C. and having sulphur content is subjected to the action of hydrogen at 325° C. and 200 atmospheres pressure for such a length of time as to reduce sulphur content, thereby lowering corrosivity, or at least providing for lowered corrosivity in a final product. The creosote of lowered sulphur content is passed through a high pressure reaction vessel while simultaneously flowing hydrogen therewith at a temperature of 410° C. and 300 atmospheres pressure. The catalyst is molybdenum oxide. The flow of hydrogen is 12,000 cubic feet per barrel creosote and the time of contact is one hour. The beneficiated creosote flowing from the reactor is inspected and will be found to have superior solvency and added toxicity and the coke residue, specific gravity, and viscosity will be reduced. No substantial percentage of liquid chain structures or kindred material will be induced nor will there be any appreciable deposition of carbonaceous increment noticeable in the reaction chamber. The beneficiated creosote is distilled to an upper limit of 270° C. with the distillate serving as the solvent of the present invention having lowered corrosivity and superior solvency; the residue serving as the wood preservative of added toxicity.

By the term superior solvency or enhanced solvency is meant among other things that the solvent or solvents so described are superior in solvency to solvents currently on the market; by the term added toxicity or enhanced toxicity is meant that the wood preservatives so described have a toxicity in excess of the parent material.

The point of fractionation between the solvent and wood preservative is not inflexible inasmuch as commercial solvents currently on the market have varied end points and wood preservatives of current usage have varied initial boiling points. Thus, inasmuch as the end point of the solvent of the present invention substantially corresponds to the initial boiling point of the wood preservative, it will be immediately obvious that the point of fractionation is not inflexible, but may be varied at will.

In the tabular data shown below are solvents and wood preservatives of accepted specification, their end point and initial boiling point, respectively:

SOLVENTS

| Identification: | End point °C. |
|---|---|
| Benzol | 120 |
| Toluol | 150 |
| Hi-flash naphtha | 200 |
| Heavy naphtha | Above 200 |

WOOD PRESERVATIVES

Specifications

1. A. W. P. A.:
   a. Up to 210° C., not more than 5%
   b. Up to 235° C., not more than 25%
2. A. W. P. A.:
   a. Up to 210° C., not more than 1%
   b. Up to 235° C., not more than 10%
   c. Up to 355° C., not less than 65%
3. A. W. P. A.:
   a. Up to 235° C., not more than 1½%
   b. Up to 300° C., not more than 16½%
   c. Up to 355° C., not less than 45%
4. A. W. P. A.:
   a. Up to 210° C., not more than 8%
   b. Up to 235° C., not more than 35%
5. A. W. P. A.:
   a. Up to 210° C., not more than 10%
   b. Up to 235° C., not more than 40%

6. A. W. P. A.:
    a. Up to 210° C., not more than 5%
    b. Up to 235° C., not more than 15%
7. Prussian Ry.:
    a. Up to 150° C., not more than 3%
    b. Up to 200° C., not more than 10%
    c. Up to 235° C., not more than 25%
8. N. P. V. & L. A. #220:
    a. 5% at 162° C.
    b. 97% at 270° C.
9. S. P. S. S. O.:
    a. 5% at 137° C.
    b. 95% at 257° C.
10. N. S. S. O.:
    a. I. B. P., 150° C.
    b. 5% at 205° C.
    c. 95% at 292° C.
11. Carbolineum, 270° C., I. B. P.

The abbreviations shown in the foregoing are explained as follows: A. W. P. A., American Wood Preservers Association; N. S. S. O., Neville Shingle Stain Oil; S. P. S. S. O., Southern Pine Shingle Stain Oil.

Among other things, the present process is adapted to provide treatment of tars of aromatic content and fractions thereof characterized by sulphur content, with hydrogen as heretofore described whereby to provide a newly induced boiling point which comprises if desired the initial boiling point of the refined solvent of lowered corrosivity, and may be controllably held at any point, as for instance to provide substitutes for any of the following:

SOLVENTS

| Identification: | Initial point, °C. |
|---|---|
| Benzol | 78 |
| Toluol | 100 |
| Hi-flash naphtha | 150 |
| High boiling crudes | 175 |
| Heavy naphtha | 150 |
| Plasticizers | 160 and above | or, solvents of special nature may be produced, as for instance having lower boiling points than above listed.

The initial or low boiling point of the beneficiated material is determined by intensity of process controls. Controls of lesser intensity produce higher boiling points, and the converse is true.

*Example 2.*—A coal tar, specific gravity 1.1641, a coke residue in excess of 5% and characterized by sulphur content is subjected to the action of hydrogen at 380° C. and 200 atmospheres pressure whereby to lower corrosivity; the material of lowered sulphur content is passed through a high pressure reaction chamber while simultaneously flowing hydrogen therewith at a temperature of 400 C. and a pressure of 300 atmospheres. The flow of hydrogen is 12,000 cubic feet per barrel feed stock and the time of contact is substantially one and one-half hours. The catalyst is vanadium oxide. The beneficiated material is found upon inspection to have superior solvency and added toxicity; the beneficiated material will be further characterized by reduction of coke residue, specific gravity and viscosity. The beneficiated material is distilled to an upper limit of 190° C. to recover the distillate as the refined solvent of lowered corrosivity, and the residue as a wood preservative of added toxic value.

The term coal tar as used herein means tar produced by high temperature carbonization of coal, as for instance, high temperature coke oven tar or gas house tar.

*Example 3.*—A coal tar fraction, initial boiling point 225° C. and having substantially 50% residue above 355° C. and characterized by sulphur content is subjected to the action of hydrogen at 380° C. and a pressure of 225 atmospheres to reduce sulphur content whereby to lower corrosivity. The tar fraction of reduced sulphur content is subjected to the action of hydrogen at 405° C. and 300 atmospheres pressure for a period of one and one half hours. The catalyst is cobalt oxide. The beneficiated material flowing from the reactor will be found to have superior solvency and added toxicity, and will be further characterized by reduction of coke residue, specific gravity and viscosity. The beneficiated material is distilled to an upper limit of 200° C. to provide the distillate as a refined solvent of lowered corrosivity and the residue as a wood preservative of added toxicity.

Instead of recovering the wood preservative as a residue incidental to the distillation recovery of the refined solvent, both the solvent and the wood preservative may be recovered as distillates, with the residue therefrom being used as an article of commerce available by virtue of its enhanced value, as for instance a binder or the like, or the residue may be recycled.

In the event the final product as the refined solvent of lowered corrosivity is taken by a deep cut on the beneficiated starting material, the higher boiling fractions of said deep cut may after further treatment serve as substitutes for certain plasticizing oils.

The catalysts of the present invention are oxides, as for instance oxides of metals of the 6th and 8th periodic groups; the oxides of other groups are usable, however, difficultly reducible oxides are preferred.

Reaction conditions in the initial step that lowers corrosivity by the action of hydrogen may be chosen from a wide range of temperatures and pressures inasmuch as sulphur reduction occurs at lowered temperatures and pressures. The lower limit of temperature and pressure is advisably that temperature and pressure which effects said reduction in a commercial manner as regards time element; pressures as high as practicable may be used, and the upper limit of temperature is defined as that temperature which causes under conditions of the process no substantial deposition of carbon, as for instance coking.

The first step of hydrogen action may be carried on in a high pressure bomb or in a continuous manner in a reaction chamber or several reaction chambers, and in the event of continuous practice, the hydrogen flow is preferably maintained so as to induce no substantial carbon deposit, as for instance coking. In the second cycle of hydrogen action, flows of hydrogen of in the order of 8,000–15,000 cubic feet per barrel feed have proven satisfactory, however, higher or lower flows may be used, the high and low limits thereof being defined as those flows that induce no undesirable coking.

By the term beneficiated as used herein and in the appended claims is meant the starting materials at least once subjected to the action of hydrogen in accordance with the present process.

Starting materials consist of tars of aromatic content and fractions thereof characterized by sulphur content, and capable of having toxicity induced therein. Materials previously subjected to the action of hydrogen are suitable starting materials.

Starting materials of the present process also include tars of aromatic content from which low boiling fractions have been removed, as for instance tars from which solvent oils have been removed. Viewed broadly, the starting materials of the present process are tars of aromatic content, fractions of said tar more viscous than the starting material due to removal of low boiling fractions from the starting material, high boiling fractions and pitches.

The term pitch as used herein includes the higher boiling fractions of tars, in other words, tar from which low boiling ends have been stripped, such low boiling ends being suitable for use per se as creosote, other wood preservative, or solvent. For instance, the final residue resulting from evaporating tar to substantial dryness and then stripping wood preservative from the distillate is a very suitable pitch for use as a starting material of the present process.

The present invention is predicated on, among other things, controlling hydrogen action in both cycles so that no substantial percentage of liquid chain structures or kindred liquids are induced that would preclude aforesaid solvency and toxicity induction. Hydrogen flow is also controlled so that no substantial percentage of the starting material is converted to coke or carbon.

The second cycle of hydrogen action may be practiced at lowered pressures and temperatures; however, pressures of in the order of 200–400 atmospheres are preferred, but higher or lower pressures may be used. Temperatures of excess of 300° C. are preferred, however, lower temperatures may be used; the upper limit of usable temperatures being defined by that temperature that causes no inordinate coking action.

Some of the starting materials in which toxicity may be induced in accordance with the present invention may contain high molecular complexes that are especially susceptible to thermal degradation; these materials may be provided with superior solvency and added toxicity while higher pressures obtain with the added benefit that such molecular complexes are reduced to a greater extent, thereby enhancing toxicity induction.

The time element of the second cycle of hydrogen action is not circumscribed by any definite time limit, but is merely that period necessary to show toxicity induction; using some starting feeds, periods of thirty minutes or less will result in enhanced toxicity, periods of one hour or longer may be used.

In the first cycle of hydrogen action that reduces sulphur content, the action may be in the presence of a catalyst. Catalysts effective in the presence of hydrogen are usable, as for instance the oxides and/or sulfides of molybdenum, vanadium, uranium, cobalt, tin, manganese, tungsten, or the like.

In the disclosures herein made the removing of low boiling fractions by gas movement or pressure release is considered the equivalent of distillation.

When reference is made to high molecular complexes contained in the starting material, and when the starting material contains low boiling fractions that are not considered high molecular complexes, it is of course obvious that the high molecular complexes contained in the starting material are to a certain extent depolymerized by the solvent present.

A convenient test that may be used to determine superior solvency is by evaluation of the well-known kauri-butanol number. A convenient test for toxicity is in accordance with "Method of conducting the tests," as described on page 2, Technical Bulletin No. 346, March, 1933, U. S. Dept. of Agriculture.

It will be seen that by reduction of sulphur content of the material under treatment during any stage of hydrogen action, the oxide catalyst used during subsequent stages is at least partially protected from the effect of the sulphur.

Minor changes may be made without departing from the spirit of the invention.

I claim:

1. In the joint production of solvents and wood preservatives, the process which comprises: subjecting a mixture of sulfur-bearing high temperature coal tar fractions to the sulfur reducing effect of hydrogen whereby to reduce sulfur content in said material; thereafter subjecting said sulfur refined material to the further action of hydrogen in the presence of an oxide catalyst with temperature and pressure so controlled as to reduce coke residue, specific gravity and viscosity; carrying on the process for such a length of time as to provide a beneficiated material from which may be fractionally recovered a relatively low boiling solvent and a relatively high boiling oil of the wood preserving type having induced toxicity and conforming in boiling range to specifications accepted in the trade for a tar-derived wood preservative and further characterized by a substantial residual above 325° C.; and fractionating the beneficiated material to provide said relatively low boiling solvent and said relatively high boiling oil of the wood preserving type.

2. The process of claim 1 in which the oil of wood preserving type is a distillate.

3. In the joint production of solvents and wood preservatives, the process which comprises: subjecting a mixture of sulfur-bearing high temperature coal tar fractions to the sulfur-reducing action of hydrogen at a temperature not substantially less than 325° C.; thereafter subjecting said sulfur refined material to the action of a flow of hydrogen not substantially less than 8,000 cubic feet per barrel feed stock in the presence of an oxide catalyst at a temperature and pressure not substantially less than 300° C. and 200 atmospheres, respectively, whereby to lower coke residue, specific gravity and viscosity; carrying on the process for such a length of time as to provide a beneficiated material from which may be fractionally recovered a relatively low boiling solvent and a relatively high boiling oil of the wood preserving type having induced toxicity and conforming in boiling range to specifications accepted in the trade for a tar-derived wood preservative, and further characterized by a substantial residual above 325° C.; and fractionating the beneficiated material to provide said relatively low boiling solvent and said relatively high boiling oil of the wood preserving type.

4. The process of claim 3 in which the oil of wood preserving type is a distillate.

JACQUELIN E. HARVEY, JR.